(No Model.) 2 Sheets—Sheet 1.
W. T. FELL.
HORSE COLLAR.

No. 528,422. Patented Oct. 30, 1894.

WITNESSES
A. Lurcott
A. Martin

INVENTOR:
W. T. Fell
BY Munn & Co
ATTORNEYS (No Model.) 2 Sheets—Sheet 2.

W. T. FELL.
HORSE COLLAR.

No. 528,422. Patented Oct. 30, 1894.

WITNESSES.
A. Lurcott
A. Martin

INVENTOR:
W. T. Fell
BY
Munn & Co
ATTORNEYS

UNITED STATES PATENT OFFICE.

WILLIAM THOMAS FELL, OF LONDON, ENGLAND.

HORSE-COLLAR.

SPECIFICATION forming part of Letters Patent No. 528,422, dated October 30, 1894.

Application filed October 12, 1893. Serial No. 488,011. (No model.) Patented in France September 3, 1891, No. 215,893, and in England June 20, 1892, No. 11,534.

*To all whom it may concern:*

Be it known that I, WILLIAM THOMAS FELL, painter and decorator, of 60 Grove Lane, Camberwell, in the county of Surrey, England, have invented new and useful Improvements in Horse-Collars, (for which I have obtained Letters Patent in the following countries, namely: Great Britain, dated June 20, 1892, No. 11,534, and France, dated September 3, 1891, No. 215,893,) of which the following is a full, clear, and exact description.

This invention relates to the construction of horse collars and has for its principal object to facilitate the harnessing and unharnessing of vicious and timid horses, and other animals of draft, by enabling the operation to be performed without passing the collar over the animal's head.

The invention consists in constructing an open-topped collar upon a steel spring as a frame which occupies the position of the forewale and which also serves the purpose of the hames. The spring is formed of a steel rod bent to the desired shape and whose ends are brought together at the top of the collar and united by a fastening, the usual padding and covering being built up on, or applied to, the steel frame, the open-topped collar being capable of springing open at the upper part to admit of slipping it on or off the animal's neck without passing it over the head or removing the halter. The normal tendency of the collar being to open as above described the operation of harnessing and unharnessing may be easily performed. The fastening by which the upper ends of the collar are united, must, of course, be such as to resist the bursting strain upon it due to the pressure of the animal's shoulders and yet be capable of being readily fastened and unfastened. The spring frame would have forged upon it the usual pulls for the traces and the loops or attachments for the terrets.

The improved construction of collar is illustrated in the accompanying drawings, forming part of this specification, wherein—

Figure 1:
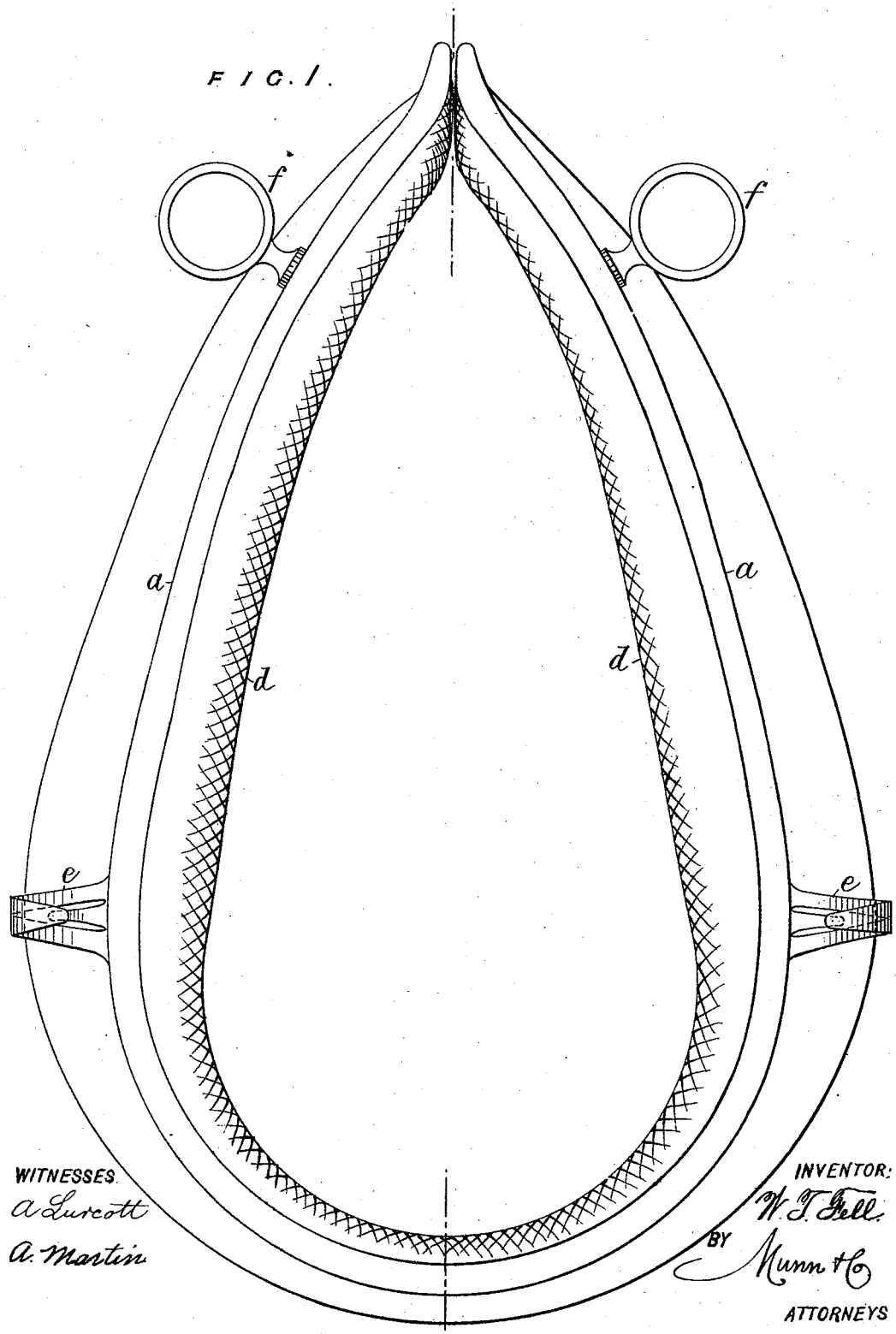
Figure 3:
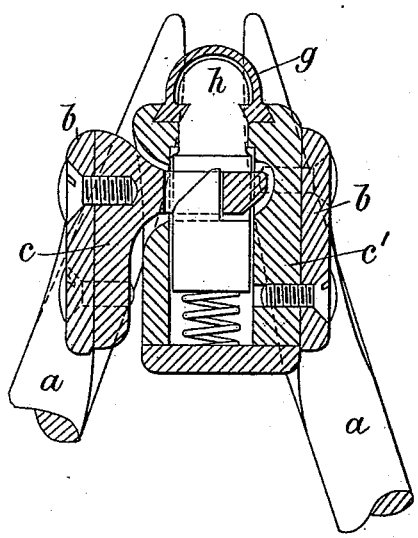
Figure 2:
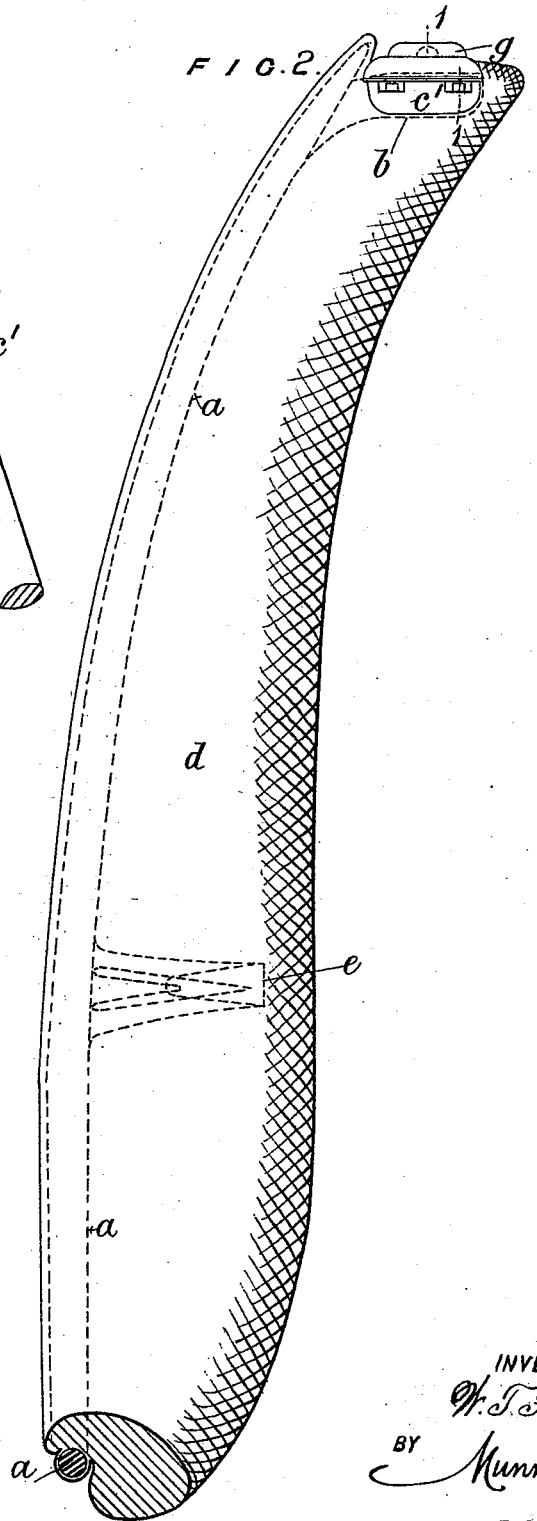

Figure 1 is a front view and Fig. 2 a central vertical section. Fig. 3 is a section of the lock, on line 1—1, Fig. 2.

$a$ is the spring frame formed of a rod preferably of round section bent to a U-form and forged with broad ends $b$ of the form shown to which are affixed the two parts $c\ c'$ of a spring latch fastening by which the ends $b$ of the spring $a$ are united. The spring $a$ occupies the position of the stuffing of the forewale, and is covered with leather, the afterwale $d$ being padded and covered in the usual manner. It is preferred to make the spring $a$ also answer the purpose of the hames and for this purpose to forge upon it the pulls $e$ and bosses to receive the stems of the terrets $f$. The fastening $c\ c'$ is a spring snap lock, and in order to guard against its accidental release a cover plate $g$ is provided sliding in a dovetail groove in the top of the lock and adapted to both cover the push piece $h$ and hold it in its locked position by inner flanges on the cover engaging in notches formed on the push piece $h$, as seen in Fig. 3.

I claim—

1. In an open topped horse collar, the combination with the ends of the said collar of the two members of a snap lock adapted to engage each other, as described, and of a safety catch or fastening adapted to engage with the bolt of the lock and lock it in its locked position, as specified.

2. A collar fastening comprising the hasp section $c$ the casing $c'$ having an opening for said hasp and a second opening provided with a sliding removable internally flanged cover $g$, and a spring catch within the casing $c'$ engaging the said hasp and provided with a push piece extending up into the opening closed by the said cover and transversely grooved to receive the cover flange; whereby the spring catch cannot be moved until the cover is removed, substantially as described.

WILLIAM THOMAS FELL.

In presence of—
 WALTER J. SKERTEN,
17 *Gracechurch Street, London, Notary's Clerk.*
 WILL HARRIS,
17 *Gracechurch Street, London, Notary Public.*